United States Patent
Murata (10) Patent No.: US 9,639,786 B2
(45) Date of Patent: May 2, 2017

(54) NON-TRANSITORY COMPUTER-READABLE MEDIUM STORING PROGRAMS FOR INFORMATION PROCESSING APPARATUS, IMAGE RECORDING APPARATUS, AND INFORMATION PROCESSING METHOD FOR PERFORMING A MANUAL DUAL-SIDED PRINT PROCESS

(71) Applicant: BROTHER KOGYO KABUSHIKI KAISHA, Nagoya-shi, Aichi-ken (JP)

(72) Inventor: Mareyuki Murata, Ogaki (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/661,175

(22) Filed: Mar. 18, 2015

(65) Prior Publication Data

US 2015/0278648 A1  Oct. 1, 2015

(30) Foreign Application Priority Data

Mar. 28, 2014  (JP) .................. 2014-067547

(51) Int. Cl.
*G06K 15/02* (2006.01)
*G06K 15/16* (2006.01)
*G06K 15/00* (2006.01)

(52) U.S. Cl.
CPC ......... *G06K 15/16* (2013.01); *G06K 15/1809* (2013.01); *G06K 15/4065* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0088679 A1* | 4/2005 | Martin | ............... | G06F 21/608 358/1.14 |
| 2006/0203289 A1* | 9/2006 | Miyata | ............... | B41J 3/60 358/1.18 |
| 2007/0041039 A1* | 2/2007 | Doui | ............... | G06F 3/1204 358/1.15 |

FOREIGN PATENT DOCUMENTS

| | | |
|---|---|---|
| JP | 2002-023991 A | 1/2002 |
| JP | 2010-036516 A | 2/2010 |

* cited by examiner

*Primary Examiner* — Henok A Shiferaw
(74) *Attorney, Agent, or Firm* — Merchant & Gould P.C.

(57) ABSTRACT

A medium stores computer executable programs. The programs cause an information processing apparatus being capable of data communication with an image recording apparatus to perform: generating image data of an image to be recorded; in a case of receiving manual double-sided printing instruction based on the generated image data, transmitting first image data of an image to be recorded on a first surface of a recording medium, together with a recording instruction based on the first image data and identification information to the image recording apparatus; and transmitting second image data of an image to be recorded on a second surface opposite to the first surface of the recording medium, together with a recording instruction based on the second image data and the same identification information as that transmitted with the first image data to the image recording apparatus, after transmitting the first image data.

13 Claims, 11 Drawing Sheets

| PRINT SETTING | | |
|---|---|---|
| PAPER SIZE | A4 ▽ | |
| ORIENTATION OF PRINTING | ● PORTRAIT | ○ LANDSCAPE |
| PRINT LAYOUT | 1 in 1 ▽ | |
| PAPER FEEDING TRAY | TRAY 1 ▽ | |
| DOUBLE-SIDED PRINTING | MANUAL ▽ | |

☑ LOCK TRAY UNTIL COMPLETION OF PRINTING

USER ID XXXX

OK    CANCEL

| TRAY 1 IS LOCKED |
| SELECT THE OTHER PAPER FEEDING TRAY |
| TRAY 2 |
| DO NOT PERFORM PRINTING |

NON-TRANSITORY COMPUTER-READABLE MEDIUM STORING PROGRAMS FOR INFORMATION PROCESSING APPARATUS, IMAGE RECORDING APPARATUS, AND INFORMATION PROCESSING METHOD FOR PERFORMING A MANUAL DUAL-SIDED PRINT PROCESS

CROSS REFERENCE TO RELATED APPLICATION

The present application claims priority from Japanese Patent Application No. 2014-067547 filed on Mar. 28, 2014, the disclosure of which is incorporated herein by reference in its entirety.

BACKGROUND

Field of the Invention

The present invention relates to programs for an information processing apparatus, an image recording apparatus that records an image on a recording medium and an information processing method.

Description of the Related Art

There has been known a printer driver having a manual double-sided printing function in which an image is printed (recorded) on one surface of a paper, and then a user turns the paper over to set it on a paper feeding tray again, and a remaining image is printed on the other surface of the paper (see Japanese Patent Application Laid-open No. 2002-23991, for example). This makes it possible to perform double-sided printing even in a printer not including a sophisticated feeder to invert a paper.

SUMMARY

However, in a case of performing manual double-sided printing, if printing of an irrelevant image is executed by a command from a different user during a period of time from the user sets the paper having an image printed on one surface thereof on the paper feeding tray till processing to print an image on the other surface of the paper is executed, the irrelevant image is printed on the other surface of the paper.

An object of the present teaching is to provide an image recording apparatus capable of, on the occasion of executing manual double-sided recording, after a recording medium having an image recorded on one surface thereof is set on a supply tray, preventing an irrelevant image from being recorded on the other surface of the recording medium, and programs for an information processing apparatus.

According to a first aspect of the present teaching, there is provided a non-transitory computer-readable medium storing computer executable programs that, when executed by a processor, cause an information processing apparatus being capable of data communication with an image recording apparatus and including an operation unit to perform: generating image data of an image to be recorded; in a case of receiving manual double-sided printing instruction based on the generated image data via the operation unit, transmitting first image data of an image to be recorded on a first surface of a recording medium, together with a recording instruction based on the first image data and identification information, to the image recording apparatus, the first image data being included in the generated image data; and transmitting second image data of an image to be recorded on a second surface opposite to the first surface of the recording medium, together with a recording instruction based on the second image data and the same identification information as that transmitted with the first image data, to the image recording apparatus, after transmitting the first image data, the second image data being included in the generated image data, wherein in a case of transmitting the first image data, the programs cause the information processing apparatus to transmit a restriction instruction, to the image recording apparatus, to restrict supply of another recording medium from a supply tray of the image recording apparatus in image recording to be performed based on a recording instruction without the same identification information as that transmitted with the first image data.

According to a second aspect of the present teaching, there is provided an image recording apparatus including: a communication unit configured to be capable of executing data communication with an information processing apparatus; a recording unit configured to record an image on a recording medium; a supply tray configured to hold the recording medium to be supplied to the recording unit; and a controller configured to control the communication unit and the recording unit, wherein in a case that the communication unit receives first image data of an image to be recorded on a first surface of the recording medium, a recording instruction based on the first image data, identification information, and a restriction instruction to restrict supply of another recording medium from the supply tray in image recording to be performed based on a recording instruction without the same identification information as that received together with the first image data, the controller is configured to start restriction of supply of another recording medium from the supply tray, during a period of time from start of recording of the image based on the first image data on the first surface to completion of the recording, and in a case that the communication unit receives second image data of an image to be recorded on a second surface opposite to the first surface of the recording medium, a recording instruction based on the second image data, and the same identification information as that received together with the first image data, the controller is configured to release the restriction of the supply of another recording medium from the supply tray, after recording of the image based on the second image data on the second surface is started.

According to a third aspect of the present teaching, there is provided an image recording apparatus including: a communication unit configured to be capable of executing data communication with an information processing apparatus; a recording unit configured to record an image on a recording medium; a supply tray configured to hold the recording medium to be supplied to the recording unit and to be openable and closable; a sensor configured to output signals indicating an open state and a closed state of the supply tray; and a controller configured to control the communication unit and the recording unit, wherein in a case that the communication unit receives first image data of an image to be recorded on a first surface of the recording medium, a recording instruction based on the first image data, identification information, and a restriction instruction to restrict supply of another recording medium from the supply tray in image recording to be performed based on a recording instruction without the same identification information as that received together with the first image data, the controller is configured to start restriction of supply of another recording medium from the supply tray, after recording of the image based on the first image data on the first surface is completed and during a period of time from the sensor outputs the signal indicating the open state of the supply tray till the sensor outputs the signal indicating the closed state of the supply tray, and in a case that the communication unit receives second image data of an image to be recorded on a second surface opposite to the first surface of the recording medium, a recording instruction based on the second image data, and the same identification information as that received together with the first image data, the controller is configured to release the restriction of the supply of another recording medium from the supply tray, after recording of the image based on the second image data on the second surface is started.

According to fourth aspect of the present teaching, there is provided an information processing method to be executed by an information processing apparatus being capable of data communication with an image recording apparatus and comprising an operation unit, the information processing method including: generating image data of an image to be recorded; in a case of receiving manual double-sided printing instruction based on the generated image data via the operation unit, transmitting first image data of an image to be recorded on a first surface of a recording medium, together with a recording instruction based on the first image data and identification information, to the image recording apparatus, the first image data being included in the generated image data; and transmitting second image data of an image to be recorded on a second surface opposite to the first surface of the recording medium, together with a recording instruction based on the second image data and the same identification information as that transmitted with the first image data, to the image recording apparatus, after transmitting the first image data, the second image data being included in the generated image data, wherein in a case of transmitting the first image data, a restriction instruction, which restricts supply of another recording medium from a supply tray of the image recording apparatus in image recording to be performed based on a recording instruction without the same identification information as that transmitted with the first image data, is transmitted to the image recording apparatus.

According to the present teachings, on the occasion of executing manual double-sided recording, a supply tray to be used for image recording on a second surface is restricted by a restriction instruction transmitted together with the first image data. Therefore, it is possible to prevent an irrelevant image from being recorded on the second surface of the recording medium set on the supply tray.

DETAILED DESCRIPTION OF EMBODIMENTS

First Embodiment

Hereinafter, there will be explained a first embodiment of the present teaching in detail with reference to the attached drawings. In this embodiment, the present teaching is applied to a printer and a driver that is installed in a personal computer (an information terminal apparatus) for the purpose of controlling the printer.

Figure 1:
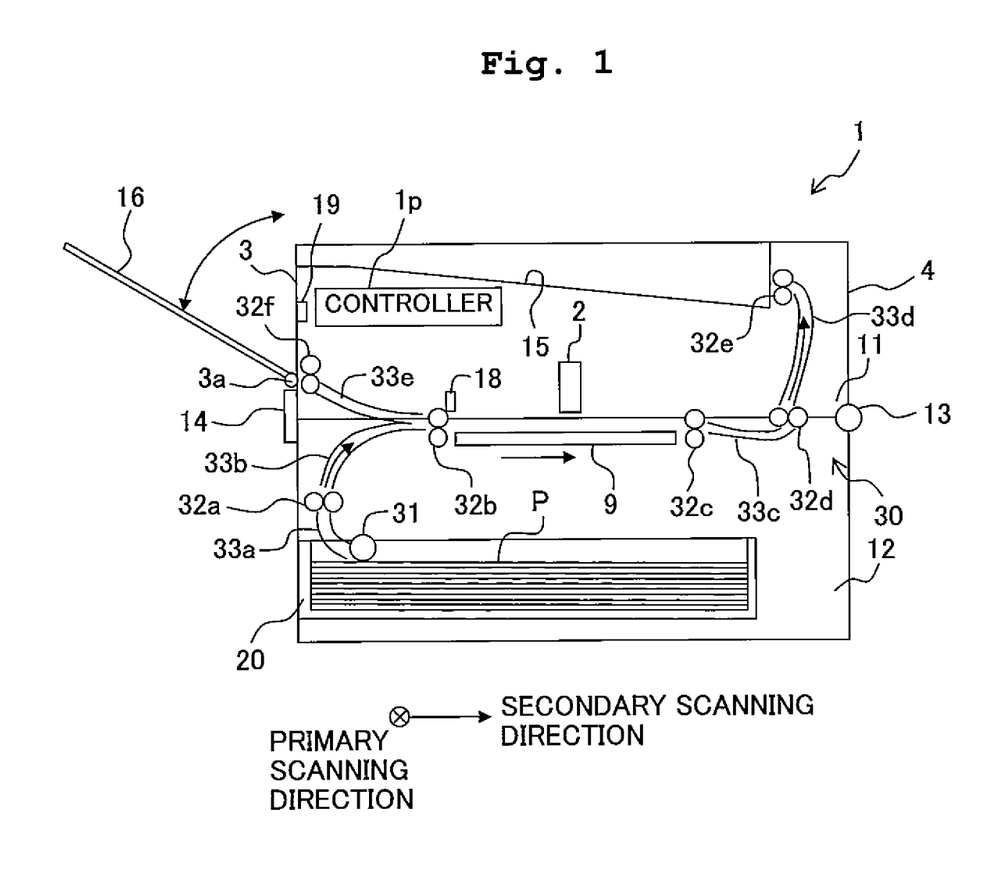
FIG. 1 is a schematic side view illustrating inside of a printer according to a first embodiment of the present teaching.

As illustrated in FIG. 1, a printer 1 has an upper casing 11 and a lower casing 12 each having a rectangular parallelepiped shape. Incidentally, of the printer 1, the left side surface in FIG. 1 is a front surface 3, and the right side surface in FIG. 1 is a rear surface 4. The upper casing 11 has an opening in a lower surface, and the lower casing 12 has an opening in an upper surface. The upper casing 11 is coupled to the lower casing 12 to be able to pivot on a horizontal pivot shaft 13. On the front surface 3 of the upper casing 11, a paper feeding tray 16 is provided. One end of the paper feeding tray 16 is fixed to a horizontal pivot shaft 3a provided on the vicinity of the front surface 3 to be able to easily pivot thereon. The paper feeding tray 16 can be brought into a closed position coming close to the front surface 3 and an open position separated from the front surface 3. On the front surface 3, a tray open/close sensor 19 is provided. The tray open/close sensor 19 outputs OFF when the paper feeding tray 16 is at a closed position and outputs ON when the paper feeding tray 16 is at an open position. An upper surface of each of papers P mounted on a mounting surface (an upper surface) of the paper feeding tray 16 at an open position is a surface to be printed. On a top surface of the upper casing 11, a paper discharge tray 15 is provided. Onto the paper discharge tray 15, the paper P on which printing has been completed is discharged sequentially with a printed surface facing downward.

Further, in an inner space of the printer 1, an ink-jet head 2, a paper feeding tray 20, a conveying mechanism 30, and a platen 9 are disposed. The paper feeding tray 20 can hold plural papers P in a stacked state, and is disposed on a bottom surface of the lower casing 12 to be easily attachable/detachable. A lower surface of each of the papers P stacked in the paper feeding tray 20 is a surface to be printed.

The ink-jet head 2 has a jetting surface on its lower surface. On the jetting surface, a plurality of nozzles from which ink drops are jetted are formed. The platen 9 is a plate member supporting the paper, and is fixed to the lower casing 12 to face the jetting surface of the ink-jet head 2 when the upper casing 11 is at a closed position.

The conveying mechanism 30 constitutes a conveyance route of the paper P that is conveyed from the paper feeding tray 16 or the paper feeding tray 20 to the paper discharge tray 15 through a space between the ink-jet head 2 and the platen 9. The conveying mechanism 30 includes a pickup roller 31, nip rollers 32a to 32f, and guides 33a to 33e. The nip roller 32f delivers the papers P stacked on the paper feeding tray 16 one by one from the top. The pickup roller 31 delivers the papers P stacked in the paper feeding tray 20 one by one from the top. The nip rollers 32a to 32e are disposed along the conveyance route to apply a conveyance force to the paper P. The guide 33a is disposed between the pickup roller 31 and the nip roller 32a, the guide 33b is disposed between the nip roller 32a and the nip roller 32b, the guide 33c is disposed between the nip roller 32c and the nip roller 32d, and the guide 33d is disposed between the nip roller 32d and the nip roller 32e on the conveyance route, and the guides 33a to 33d guide the paper P to which a conveyance force is applied by each of the nip rollers 32a to 32e. The guide 33e guides the paper P delivered by the nip roller 32f to the nip roller 32b. While the paper P conveyed by the conveying mechanism 30 passing through between the ink-jet head 2 and the platen 9, an image is printed on a printing surface of the paper P by ink drops jetted from the nozzles of the ink-jet head 2. The paper P on which the image has been printed is further conveyed by the conveying mechanism 30 and is discharged onto the paper discharge tray 15.

On the immediate downstream side of the nip roller 32b on the conveyance route, a paper sensor 18 is disposed. When a downstream-side end portion in the conveyance direction of the paper P that is being conveyed by the conveying mechanism in the conveyance direction passes below the paper sensor 18, an output signal of the paper sensor 18 changes. By the timing at which the output signal of the paper sensor 18 changes, the jet timing of ink drops to be jetted from the nozzles of the ink-jet head 2 is determined.

Figure 2:
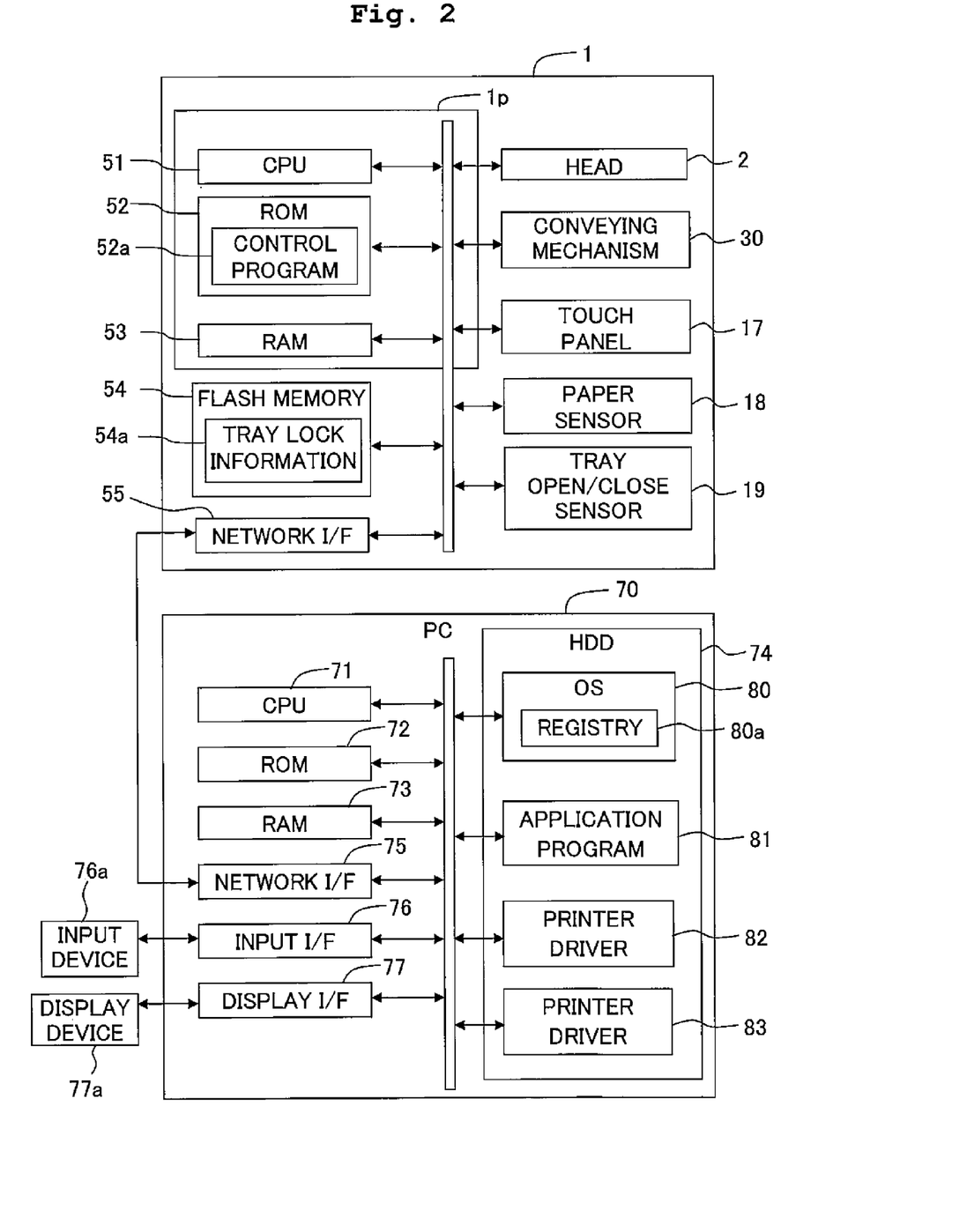
FIG. 2 is a functional block diagram of the printer illustrated in FIG. 1 and a PC.
Figure 3A:
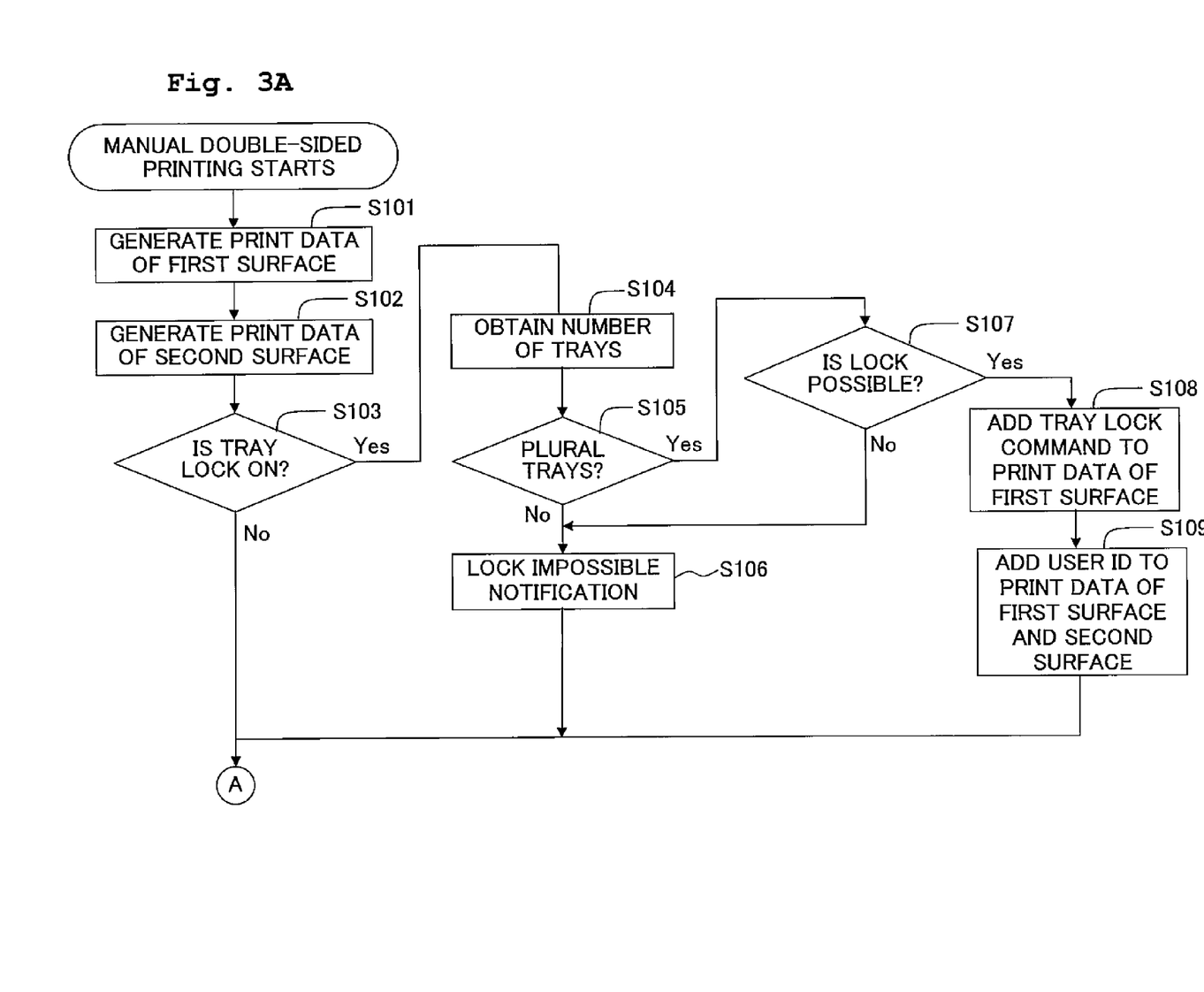
FIGS. 3A and 3B show a flowchart illustrating processing procedures of manual double-sided printing executed by a driver installed in the PC illustrated in FIG. 2.
Figure 3B:
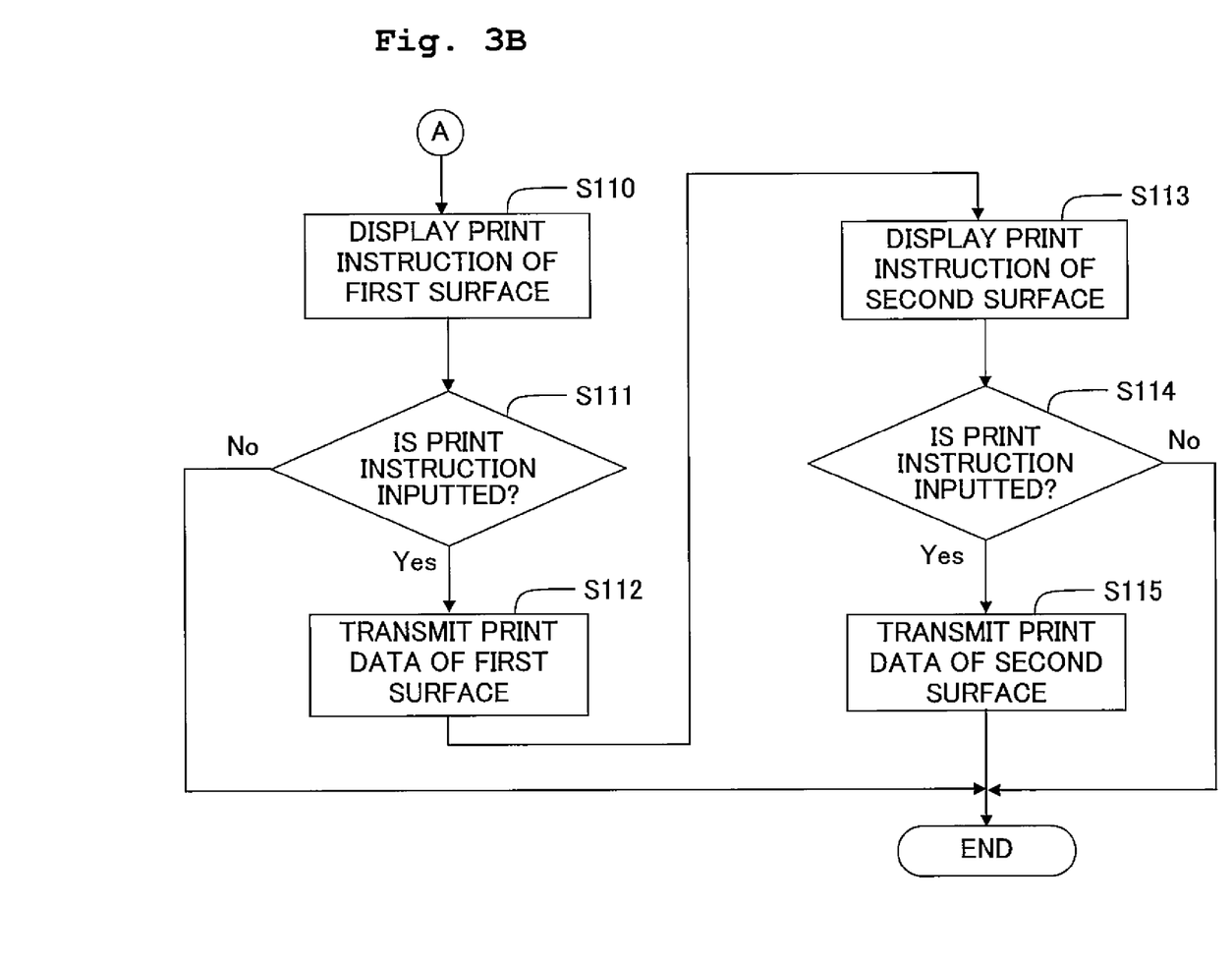

The printer 1 has a controller 1p. The controller 1p is provided with a CPU 51, a ROM 52, and a RAM 53 as illustrated in FIG. 2. Further, the controller 1p is electrically connected to a flash memory 54, a network interface 55, the head 2, the conveying mechanism 30, a touch panel 17, the paper sensor 18, and the tray open/close sensor 19.

The touch panel 17 is a user interface provided with an input function and a display function, and displays an operation condition of the printer 1 and accepts an input manipulation by a user.

In the ROM 52, firmware being a control program 52a used for controlling the printer 1, various settings, initial values, and the like are stored. The RAM 53 and the flash memory 54 are used as a working area from which various control programs are read, or a storage area in which data are stored temporarily. Further, in the flash memory 54, tray lock information 54a indicating whether or not uses of the paper feeding trays 16 and 20 are locked is stored. In the tray lock information 54a, information on whether or not each of the paper feeding trays 16 and 20 is locked (use is regulated) is stored. Further, when each of the paper feeding trays 16 and 20 is locked, a user ID of a user who locked the paper feeding tray and a lock start time are stored. Further, in the flash memory 54, as unique information of the printer 1, an IP (Internet Protocol) address and the like are stored.

The CPU 51 controls individual components of the printer 1 while storing processing results in the RAM 53 or the flash memory 54 in accordance with the control program 52a read from the ROM 52 and signals transmitted from various sensors.

The network interface 55 performs transmission and reception of data with various apparatuses such as a PC (Personal Computer) 70 connected to a LAN (Local Area Network) to which the printer 1 is connected. The transmission and reception of data may be performed by communication in a wireless system, or may also be performed by communication in a wired system.

The printer 1 executes the control program 52a in accordance with commands received from the touch panel 17 or the PC 70 via the LAN (the network interface 55), to thereby execute various processings including printing processing. When the printing processing is executed, an image of print data received with the command is printed on the paper by the ink-jet head 2.

The PC 70 has a CPU 71, a ROM 72, a RAM 73, a HDD (Hard Disk Drive) 74, a network interface 75, an input interface 76 (an example of an operation unit), and a display interface 77.

The network interface 75 performs transmission and reception of data with various apparatuses connected to the LAN to which the PC 70 is connected. The transmission and reception of data may be performed by communication in a wireless system, or may also be performed by communication in a wired system. In FIG. 2, the network interface 75 is connected to the network interface 55 of the printer 1 via the LAN. Thereby, the PC 70 and the printer 1 can perform data communication with each other.

To the input interface 76, an input device (a mouse and a keyboard) 76a is connected, and to the display interface 77, a display device (a monitor) 77a is connected. In the HDD 74, an OS (Operating System) 80 is installed. The OS 80 includes a registry 80a in which management information regarding individual installed drivers, and the like are stored. In the HDD 74, an application program 81, and printer drivers 82 and 83 are installed. The printer driver 82 corresponds to the printer 1, and the printer driver 83 corresponds to another type of printer. The CPU 71 executes the printer drivers 82 and 83, thereby controlling operations of the printers corresponding to the executed printer drivers 82 and 83.

The printer driver 82 can make the printer 1 execute manual double-sided printing processing, in addition to normal printing processing. The manual double-sided printing processing is that printing is performed on one surface (to be referred to as a first surface, hereinafter) of a paper, and then a user is made to set the paper with the printed first surface on the paper feeding tray again, and a remaining image is printed on the other surface (to be referred to as a second surface, hereinafter) of the paper. This allows even the printer 1 that is not provided with a sophisticated conveying mechanism that inverts a paper to perform double-sided printing.

With reference to FIG. 3A to FIG. 5, there will be explained in detail operation procedures of the manual double-sided printing processing executed by the CPU 71 in accordance with the printer driver 82.

Figure 4A:
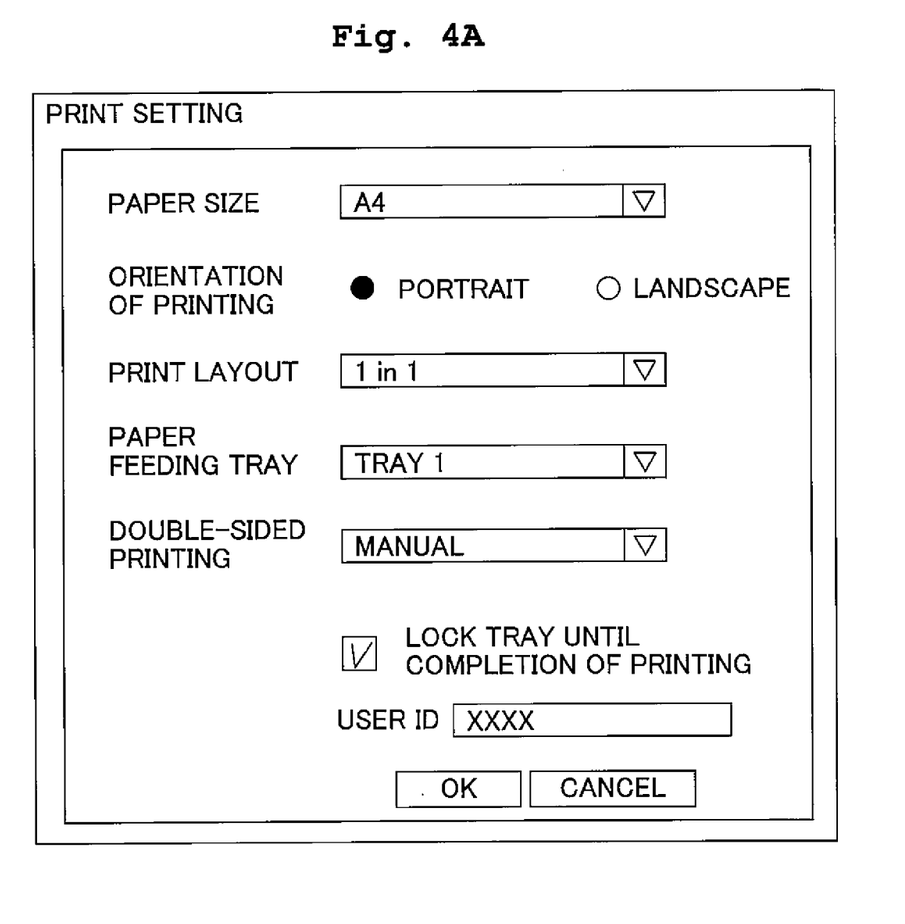
FIG. 4A and FIG. 4B are examples of a setting window and a notification window to be displayed on the PC illustrated in FIG. 2 respectively.

First, when by the input device 76a, a print request of displayed document data or the like is input in the application program 81 such as a document creation application executed by the CPU 71, the application program 81 displays a print instruction window. The print instruction window includes a pull-down menu used for selecting either the printer driver 82 or the printer driver 83 installed in the PC 70, a print instruction icon, and a print setting icon. When the print setting icon is selected by the input device 76a, by the printer driver 82 or the print driver 83 selected on the pull-down menu, a setting window illustrated in FIG. 4A is further displayed. A user manipulates the input device 76a, to thereby select a paper size ("A4" in FIG. 4A), an orientation ("portrait" in FIG. 4A), a layout ("1 in 1" in FIG. 4A), a method of the double-sided printing processing ("manual" in FIG. 4A), and a paper feeding tray to be used for printing processing of the second surface ("tray 1" in FIG. 4A). Incidentally, in FIG. 4A, "tray 1" corresponds to the paper feeding tray 16.

Further, the user selects whether or not to regulate use of the paper feeding tray to be used for printing processing of the second surface, (which has been already set in the processing above), for another printing (perform tray lock) by the time when printing of the second surface is started after printing of the first surface is completed. When selecting to regulate use of the paper feeding tray (tray lock ON), the user inputs the user ID as identification information to identify print data. When an OK icon is selected, the print setting is completed.

Thereafter, when the print instruction icon is selected on the print instruction window, the print instruction being input is transmitted to the printer driver 82 via the OS 80. Then, the CPU 71 executes the manual double-sided printing processing illustrated in FIGS. 3A and 3B in accordance with the printer driver 82. First, the CPU 71 generates print data of the first surface and the second surface based on a data file of the document data with the print request input in the application program 81 (generation processing: S101 and S102). The CPU 71 determines whether or not the tray lock is ON by the print setting (S103). When the CPU 71 determines that the tray lock is not ON (S103: NO), the processing proceeds to S110 (to be explained later).

Figure 4B:
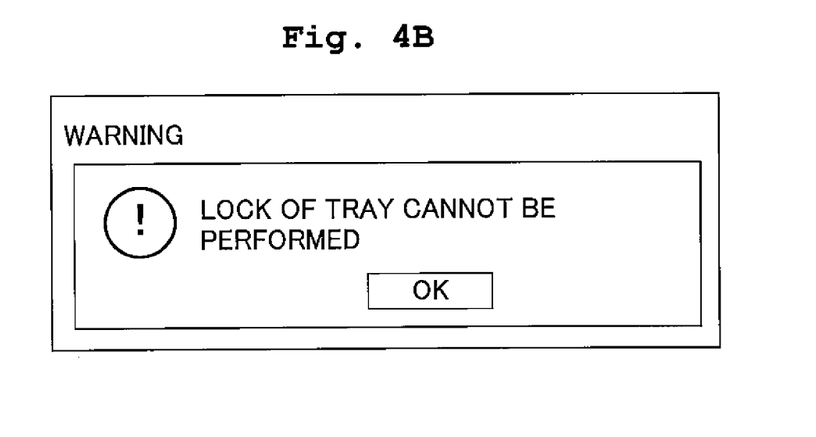

When determining that the tray lock is ON (S103: YES), the CPU 71 obtains the number of paper feeding trays of the printer 1 (S104), and determines whether or not plural paper feeding trays exist (S105). For example, in this embodiment, the printer 1 has the two paper feeding trays 16 and 20. When determining that plural paper feeding trays do not exist (S105: NO), the CPU 71 notifies the user that the tray lock is impossible (S106) as illustrated in FIG. 4B, and the processing proceeds to S110. When determining that plural paper feeding trays exist (S105: YES), the CPU 71 determines whether or not lock of the specified paper feeding tray is possible (S107). The case where lock is not possible includes the case where the paper feeding tray is already locked by a different print command, and the like. When lock of the specified paper feeding tray is not possible (S107: NO), the CPU 71 notifies the user that the tray lock is impossible (S106), and the processing proceeds to S110.

When lock of the specified paper feeding tray is possible (S107: YES), the CPU 71 adds a tray lock command (an example of a restriction instruction) to the print data of the first surface (S108), and adds the user ID (see FIG. 4A) to each of the print data of the first surface and the print data of the second surface (S109). Then, the processing proceeds to S110.

Figure 5A:
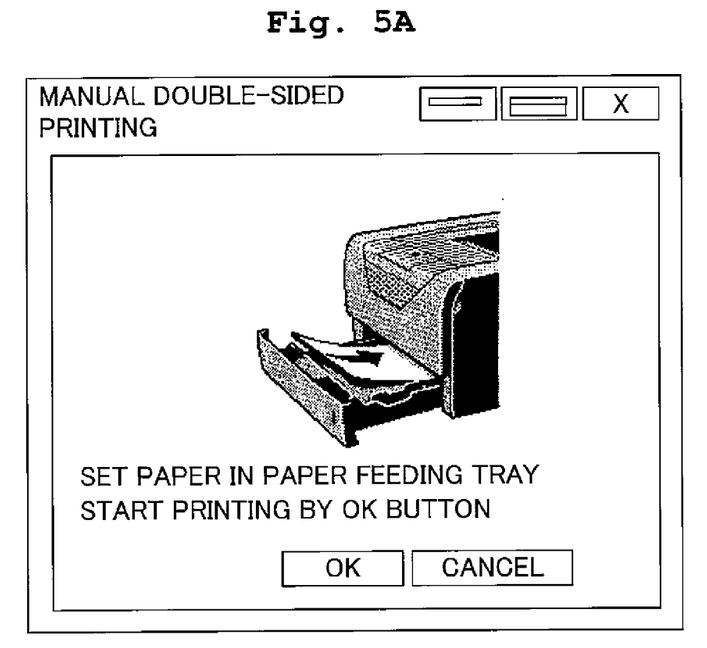
FIG. 5A and FIG. 5B are examples of print instructions to be displayed on the PC illustrated in FIG. 2.

The CPU 71, as illustrated in FIG. 5A, displays a first instruction window urging the user to execute printing of the first surface on the display device 77a (S110). The CPU 71 determines whether or not a print instruction to the first instruction window is input by the user based on whether or not an OK icon on the first instruction window is selected by the input device 76a (S111). When determining that a cancel icon is selected by the input device 76a, namely when determining that no print instruction is input (S111:NO), the CPU 71 discontinues the manual double-sided printing, and finishes the processing illustrated in a flowchart in FIGS. 3A and 3B. When determining that a print instruction is input (S111: YES), the CPU 71 creates a print job by the print data of the first surface (including the tray lock command and the user ID added in the above-described processing) and the command to execute the printing processing (including the specification of the paper feeding tray) to transmit the created print job to the printer 1 (S112).

Figure 5B:
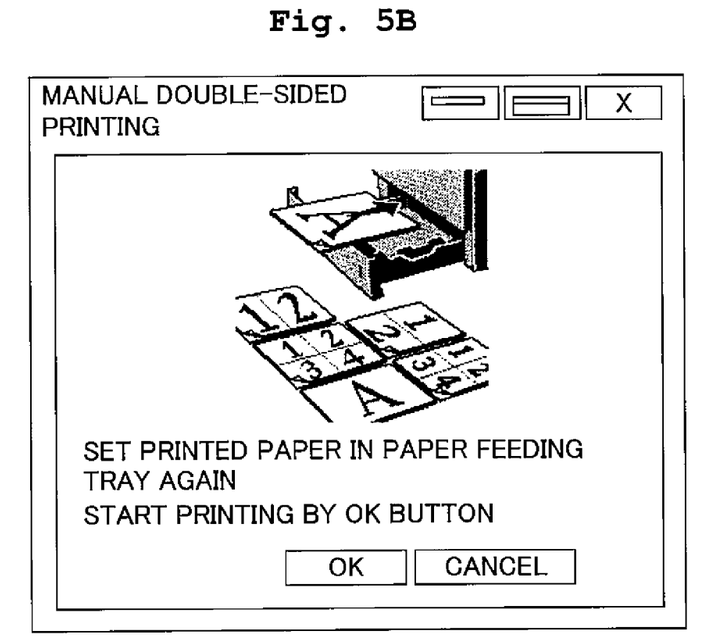

The CPU 71, as illustrated in FIG. 5B, displays a second instruction window urging the user to execute printing of the second surface on the display device 77a (S113). The CPU 71 determines whether or not a print instruction to the second instruction window is input by the user based on whether or not an OK icon on the second instruction window is selected by the input device 76a (S114). When determining that a cancel icon is selected by the input device 76a, namely when determining that no print instruction is input (S114: NO), the CPU 71 discontinues the manual double-sided printing, and finishes the processing illustrated in the flowchart in FIGS. 3A and 3B. When determining that a print instruction is input (S114: YES), the CPU 71 creates a print job by the print data of the second surface (including the user ID added in the above-described processing) and the command to execute the printing processing (including the specification of the paper feeding tray) to transmit the created print job to the printer 1 (S115). Then, the CPU 71 finishes the processing illustrated in the flowchart in FIGS. 3A and 3B.

Figure 6A:
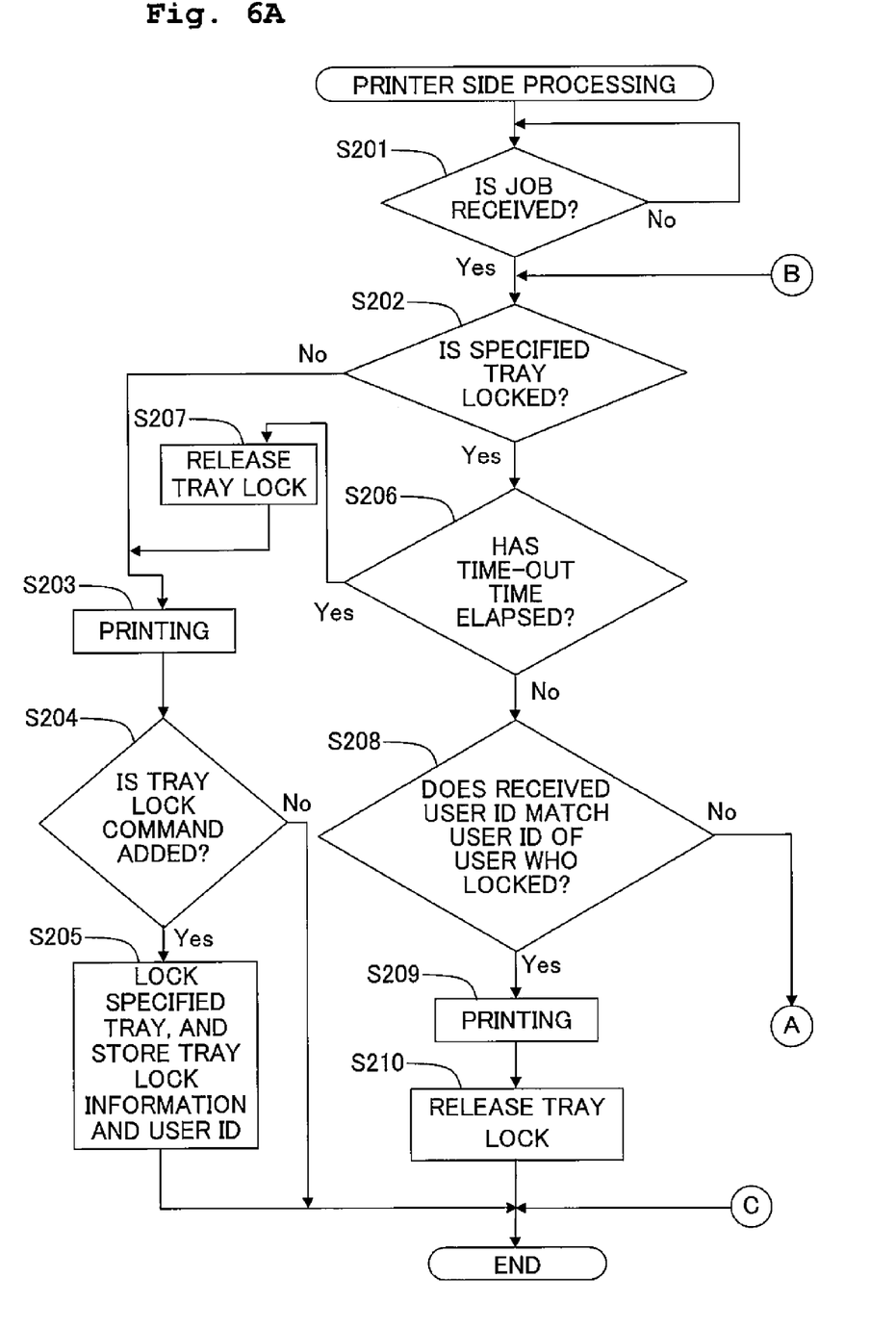
FIGS. 6A and 6B show a flowchart illustrating processing procedures of manual double-sided printing executed by the printer illustrated in FIG. 2.
Figure 6B:
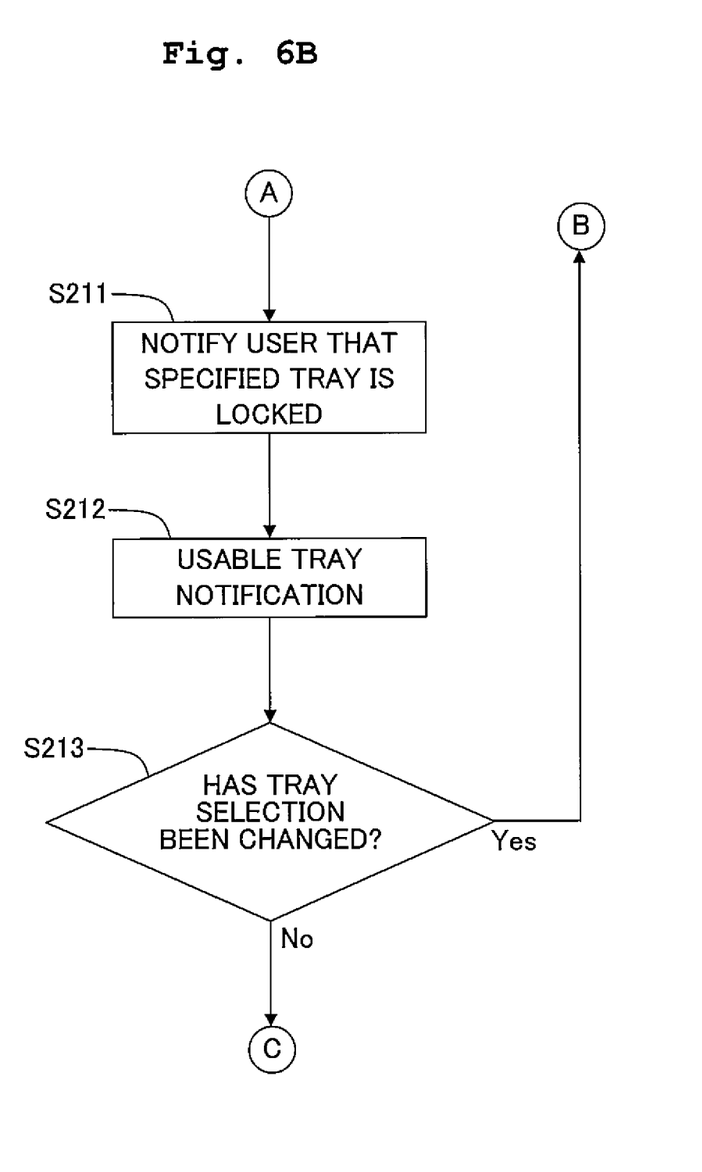
Figure 7:
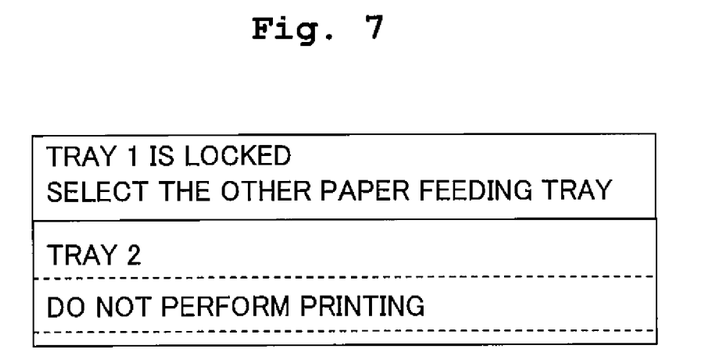
FIG. 7 is an example of a display screen to be displayed on the printer illustrated in FIG. 2.

Next, there will be explained operation procedures of the printer 1 in the printing processing with reference to FIGS. 6A, 6B and 7. The CPU 51 waits until the CPU 51 receives the print job from the PC 70 (S201: NO). When receiving the print job from the PC 70 (S201: YES), the CPU 51 refers to the tray lock information 54a and determines whether or not the paper feeding tray specified by the command contained in the received print job is locked (S202). When determining that the paper feeding tray is not locked (S202: NO), the CPU 51 executes the printing processing in accordance with the received print job (S203). While executing the printing processing, the CPU 51 determines whether or not the tray lock command is added to the received print job (whether or not data is the print data of the first surface) (S204). This determination may also be performed before the printing processing starts. When determining that the tray lock command is not added (S204: NO), the CPU 51 finishes the processing illustrated in a flowchart in FIGS. 6A and 6B.

When determining that the tray lock command is added to the print job (S204: YES), the CPU 51 locks the specified paper feeding tray and stores the fact that the specified paper feeding tray is locked, the user ID of the user who locked the paper feeding tray, and the lock start time in the tray lock information 54a at the time when the printing processing is completed (S205). Then, the CPU 51 finishes the processing illustrated in the flowchart in FIGS. 6A and 6B.

When determining that the paper feeding tray specified by the command contained in the print job is locked (S202: YES), the CPU 51 refers to the tray lock information 54a and determines whether or not an elapsed time from the lock start time regarding the paper feeding tray exceeds a previously determined time-out time (predetermined time) (S206). When determining that the elapsed time exceeds the time-out time (S206: YES), the CPU 51 releases the lock of the specified paper feeding tray and stores the fact that the specified paper feeding tray is not locked in the tray lock information 54a (S207). Then, the CPU 51 proceeds to S203 and executes the printing processing.

When determining that the elapsed time does not exceed the time-out time (S206: NO), the CPU 51 determines whether or not the user ID added to the received print data and the user ID of the user who locked the paper feeding tray that is stored in the tray lock information 54a match each other (whether or not data is the print data of the second surface) (S208). When determining that the user ID added to the received print data and the user ID of the user who locked the paper feeding tray match each other (S208: YES), the CPU 51 executes the printing processing in accordance with the received print job (S209). Then, the CPU 51 releases the lock of the specified paper feeding tray and stores the fact that the specified paper feeding tray is not locked in the tray lock information 54a (S210) after the printing processing starts. Then, the CPU 51 finishes the processing illustrated in the flowchart in FIGS. 6A and 6B. Incidentally, the timing at which the lock is released is not limited to the time during the printing processing, may be at the time of completion of the printing processing, or may also be after that as long as it is after start of the printing processing. However, it is preferably immediately after start of the printing processing.

When determining that the user ID added to the received print data and the user ID of the user who locked the paper feeding tray do not match each other (S208: NO), as illustrated in FIG. 7, the CPU 51 notifies the user of a message indicating that the specified paper feeding tray is locked (S211) and of a message urging the user to select the other usable paper feeding tray and to change the specified paper feeding tray (S212) on the touch panel 17. The CPU 51 determines whether or not the user manipulates the touch panel 17 to change selection of the paper feeding tray (S213). When determining that the user did not change selection of the paper feeding tray (S213: NO), the CPU 51 finishes the processing illustrated in the flowchart in FIGS. 6A and 6B. When determining that the user changed selection of the paper feeding tray (S213: YES), the CPU 51 proceeds to S202 and executes the above-described processing repeatedly for the changed paper feeding tray.

As explained in detail above, according to the printer driver 82 and the printer 1 in this embodiment, in the manual double-sided printing, the supply tray to be used for printing on the second surface is reserved by the print job of the first surface. Therefore, it is possible to prevent an irrelevant image from being printed on the second surface of the paper set on the supply tray.

Further, the paper feeding tray to be used for the printing processing of the second surface (see FIG. 4A) can be selected from the paper feeding trays 16 and 20 on the setting window by the printer driver 82, so that the supply tray according to the user's desire can be used.

Further, the PC 70 obtains the number of paper feeding trays controlled by the CPU 51 and performs the tray lock only in the case when the obtained number of paper feeding trays is plural, so that it is possible to shorten the time during which printing performed by a different user is regulated.

Further, in the manual double-sided printing, the same user ID is given to the print data of the first surface and the print data of the second surface, to thereby make the both associated with each other, so that the processing is simplified.

Further, when the elapsed time from the lock start time exceeds the time-out time, the lock is released, so that it is possible to prevent the time of the paper feeding tray being locked from being prolonged more than necessary.

Additionally, only the single supply tray is locked when the manual double-sided printing is performed one time, so that there is no case that the supply tray is locked unnecessarily.

Further, when the specified paper feeding tray is locked, the user is urged to change the specified paper feeding tray to the other usable paper feeding tray. Therefore, it is possible to efficiently use the supply tray.

Modified Example

In this embodiment, the user ID is used as the identification information used for performing the association of the print data of the first surface and the print data of the second surface, but as long as the association can be performed, all the types of identification information are applied. The identification information may be, for example, a user account to be used when a user logs in to a network, or may also be unique information of a transmission source apparatus (for example, the PC 70). Further, it may also be an ID that the printer driver issues every time it generates print data.

Second Embodiment

There will be explained a second embodiment of the present teaching with reference to FIGS. 8A and 8B. Incidentally, the same symbols and numerals are given to substantially the same members and processing procedures as those in the first embodiment, and their explanations are omitted. This embodiment is different in operation procedure of the printer in the printing processing from the first embodiment, so that the operation procedure of the printer in the printing processing will be explained below. In the first embodiment, the tray open/close sensor 19 outputs OFF when the paper feeding tray 16 is at a closed position and outputs ON when the paper feeding tray 16 is at an open position, but in this embodiment, the tray open/close sensor 19 outputs the same signals with regard also to the paper feeding tray 20.

Figure 8A:
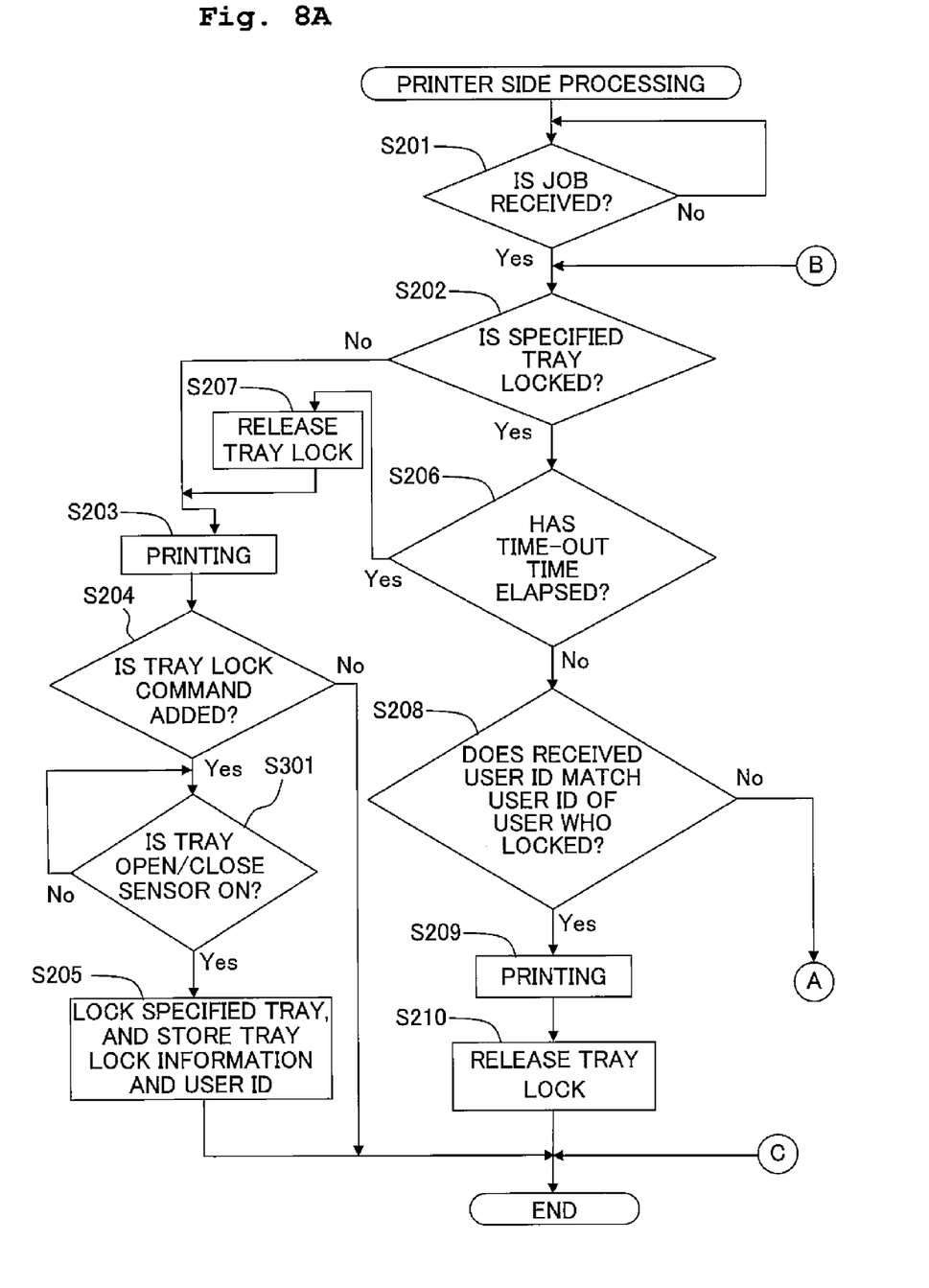
FIGS. 8A and 8B show a flowchart illustrating processing procedures of manual double-sided printing executed by the printer according to a second embodiment of the present teaching.
Figure 8B:
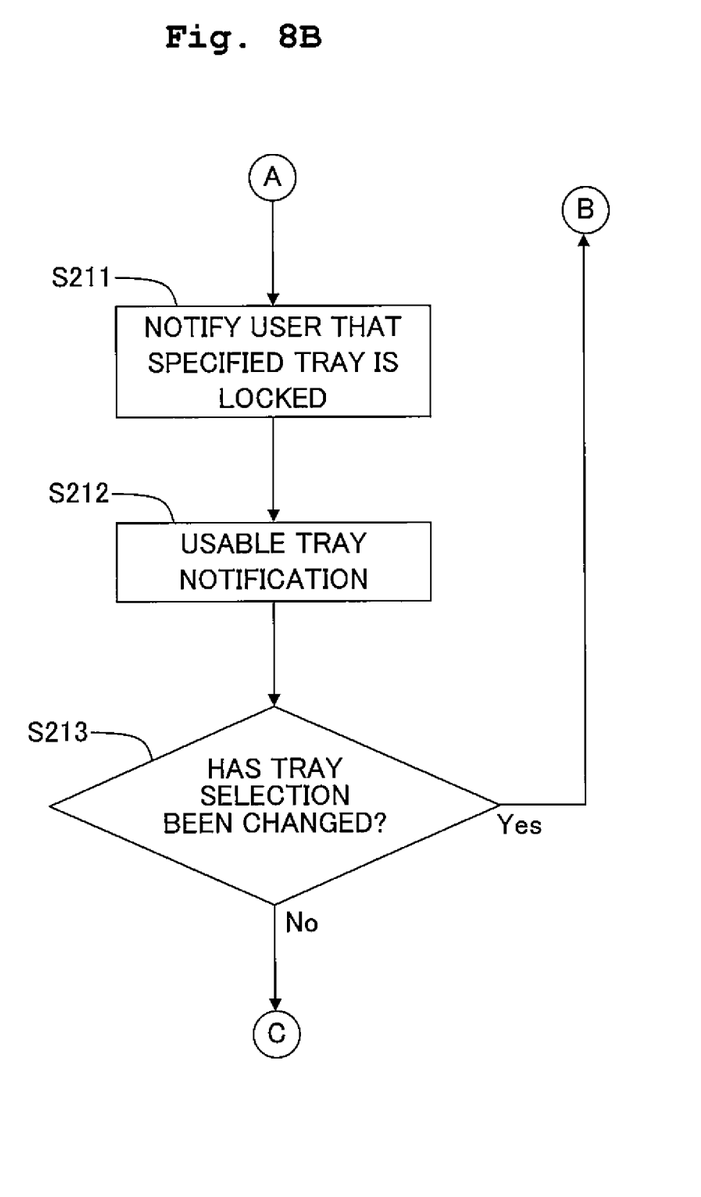

As illustrated in FIG. 8A, the CPU 51 determines whether or not the tray lock command is added to the received print job (whether or not data is the print data of the first surface) (S204). When determining that the tray lock command is not added (S204: NO), the CPU 51 finishes processing illustrated in a flowchart in FIGS. 8A and 8B. When determining that the tray lock command is added (S204: YES), the CPU 51 waits until the tray open/close sensor 19 is turned ON with regard to the specified paper feeding tray to be used for the printing processing of the second surface (S301: NO). When determining that the tray open/close sensor 19 is turned ON (S301: YES), the CPU 51 locks the specified paper feeding tray and stores the fact that the specified paper feeding tray is locked and the user ID of the user who locked the specified paper feeding tray, and the lock start time in the tray lock information 54a (S205). Then, the CPU 51 finishes the processing illustrated in the flowchart in FIGS. 8A and 8B. The other processings are the same as those in the first embodiment, so that their explanations are omitted.

As explained in detail above, according to the printer driver 82 and the printer 1 of this embodiment, when the manual double-sided printing is executed, the supply tray to be used for printing on the second surface is reserved by the print job of the first surface, so that it is possible to prevent an irrelevant image from being printed on the second surface of the paper set on the supply tray.

Incidentally, these embodiments are merely examples and are not limited to the present teaching. Thus, it is a matter of course that the present teaching can be variously improved and modified without departing from the spirit of the teaching. For example, the above-described first embodiment is configured that at the time of completion of the printing processing of the first surface, the lock of the specified paper feeding tray is started, but the timing at which the lock of the paper feeding tray is started may be an arbitrary timing as long as it is between the time when the printing processing of the first surface is started and the time when it is completed.

Further, in the above-described second embodiment, the printing processing of the first surface is completed, and immediately after the signal output from the tray open/close sensor is turned ON with regard to the specified paper feeding tray, the lock of the specified paper feeding tray is started, but the timing at which the lock of the paper feeding tray is started may be an arbitrary timing as long as it is between the time when the signal output from the tray open/close sensor is turned ON and the time when it is turned OFF.

Further, in the above-described embodiments, the paper feeding tray to be used for the printing processing of the second surface (see FIG. 4A) can be selected from the paper feeding trays 16 and 20 on the setting window by the printer driver 82, but the supply tray that can be used for the printing processing of the second surface may also be determined previously.

Further, in the above-described embodiments, the PC 70 obtains the number of paper feeding trays of the printer 1 and only in the case when the obtained number of paper feeding trays is plural, the tray lock is performed, but the tray lock may also be performed even when the number of paper feeding trays is one.

Further, in the above-described embodiments, the lock is released when the elapsed time from the lock start time exceeds the time-out time, but it is also possible that such a time-out time is not provided.

Additionally, in the above-described embodiments, only the single supply tray is locked when the manual double-sided printing is performed one time, but all the paper feeding trays may also be locked when the manual double-sided printing is performed one time.

Further, in the above-described embodiments, when the specified paper feeding tray is locked, the user is urged to change the specified paper feeding tray to the other usable paper feeding tray, but it is also possible that such change of selection is not performed.

Further, the example where the present teaching is applied to the printer has been explained, but the present teaching is applicable to all the apparatuses capable of executing printing processing, and is applicable also to, for example, a facsimile machine.

What is claimed is:

1. A non-transitory computer-readable medium storing computer executable programs that, when executed by a processor, cause an information processing apparatus being capable of data communication with an image recording apparatus and comprising an operation unit to perform:
   generating image data of an image to be recorded;
   in a case of receiving manual double-sided printing instruction based on the generated image data via the operation unit,
   transmitting first image data of an image to be recorded on a first surface of a recording medium, together with a recording instruction based on the first image data and identification information, to the image recording apparatus, the first image data being included in the generated image data and the identification information associated with the information processing apparatus or user of the information processing apparatus; and
   transmitting second image data of an image to be recorded on a second surface opposite to the first surface of the recording medium, together with a recording instruction based on the second image data and the same identification information as that transmitted with the first image data, to the image recording apparatus, after transmitting the first image data, the second image data being included in the generated image data,
   wherein in a case of transmitting the first image data, the programs cause the information processing apparatus to transmit a restriction instruction, to the image recording apparatus, to restrict supply of another recording medium from a supply tray of the image recording apparatus in image recording to be performed based on a recording instruction from another information processing apparatus, the recording instruction being associated with a different user and not having the same identification information as that transmitted with the first image data.

2. The medium according to claim 1,
   wherein in a case that the image recording apparatus includes a plurality of supply trays, the programs cause the information processing apparatus to further perform selecting one supply tray which is included in the plurality of supply trays and to be used at the time of recording the image on the second surface of the recording medium, based on a user operation on the operation unit, and
   the restriction instruction restricts supply of the recording medium from the one supply tray which is selected.

3. The medium according to claim 2,
   wherein the programs cause the information processing apparatus to further perform obtaining the number of usable supply trays provided for the image recording apparatus, and
   only in a case that the obtained number of supply trays is two or more, the programs cause the information processing apparatus to transmit the restriction instruction to the image recording apparatus.

4. The medium according to claim 1,
   wherein the identification information is information to identify the recording instructions of the manual double-sided printing, and
   in a case of transmitting the second image data, the programs cause the information processing apparatus to transmit identification information, which is associated with the identification information transmitted together with the first image data.

5. The medium according to claim 1, wherein the identification information is information to identify the information processing apparatus.

6. The medium according to claim 1, wherein the identification information is information to identify a user account of a user being logged in to the information processing apparatus.

7. An image recording apparatus comprising:
   a network interface configured to be capable of executing data communication with an information processing apparatus;
   a recording unit configured to record an image on a recording medium;
   a supply tray configured to hold the recording medium to be supplied to the recording unit; and
   a controller configured to control the network interface and the recording unit,
   wherein in a case that the network interface receives first image data of an image to be recorded on a first surface of the recording medium, a recording instruction based on the first image data, identification information associated with an information processing apparatus or user of the information processing apparatus, and a restriction instruction to restrict supply of another recording medium from the supply tray in image recording to be performed based on a recording instruction from another information processing apparatus, the recording instruction being associated with a different user and not having the same identification information as that received together with the first image data from another information processing apparatus, the controller is configured to start restriction of supply of another recording medium from the supply tray, during a period of time from start of recording of the image based on the first image data on the first surface to completion of the recording, and in a case that the network interface receives second image data of an image to be recorded on a second surface opposite to the first surface of the recording medium, a recording instruction based on the second image data, and the same identification information as that received together with the first image data, the controller is configured to release the restriction of the supply of another recording medium from the supply tray, after recording of the image based on the second image data on the second surface is started.

8. The image recording apparatus according to claim 7, wherein the controller is configured to release the restriction of the supply of another recording medium from the supply tray, in a case that a predetermined time has elapsed without receiving the recording instruction based on the second image data by the network interface, after the controller starts the restriction of supply of another recording medium from the supply tray.

9. The image recording apparatus according to claim 7, wherein the supply tray is provided as a plurality of supply trays, and the controller is configured to receive information indicating one supply tray which is included in the plurality of supply trays and to be used at the time of recording of the image on the second surface of the recording medium, and to restrict supply of another recording medium only from the one supply tray.

10. The image recording apparatus according to claim 9, wherein in a case that the network interface receives another recording instruction without the same identification information as that transmitted with the first image data after the controller starts the restriction of supply of another recording medium from the one supply tray, the controller is configured to notify a user of information for specifying another supply tray which is usable.

11. An information processing method to be executed by an information processing apparatus being capable of data communication with an image recording apparatus and comprising an operation unit, the information processing method comprising:

generating image data of an image to be recorded;

in a case of receiving manual double-sided printing instruction based on the generated image data via the operation unit, transmitting first image data of an image to be recorded on a first surface of a recording medium, together with a recording instruction based on the first image data and identification information, to the image recording apparatus, the first image data being included in the generated image data and the identification information associated with the information processing apparatus or user of the information processing apparatus; and transmitting second image data of an image to be recorded on a second surface opposite to the first surface of the recording medium, together with a recording instruction based on the second image data and the same identification information as that transmitted with the first image data, to the image recording apparatus, after transmitting the first image data, the second image data being included in the generated image data, wherein in a case of transmitting the first image data, a restriction instruction, which restricts supply of another recording medium from a supply tray of the image recording apparatus in image recording to be performed based on a recording instruction from another information processing apparatus, the recording instruction being associated with a different user and not having the same identification information as that transmitted with the first image data, is transmitted to the image recording apparatus.

12. The method according to claim 11, wherein in a case that the image recording apparatus includes a plurality of supply trays, the method further comprising selecting one supply tray which is included in the plurality of supply trays and to be used at the time of recording the image on the second surface of the recording medium, based on a user operation on the operation unit, and the restriction instruction restricts supply of the recording medium from the one supply tray which is selected.

13. The method according to claim 12, wherein the method further comprising obtaining the number of usable supply trays provided for the image recording apparatus, and only in a case that the obtained number of supply trays is two or more, the restriction instruction is transmitted to the image recording apparatus.

* * * * *